United States Patent

Hamilton et al.

[11] Patent Number: 5,119,564
[45] Date of Patent: Jun. 9, 1992

[54] LINE OF SIGHT TARGET ADAPTOR

[75] Inventors: Joseph D. Hamilton; Michael E. Ullmer, both of Columbus, Ohio

[73] Assignee: Computerized Idustrial Measurements, Inc., Columbus, Ohio

[21] Appl. No.: 674,009

[22] Filed: Mar. 22, 1991

[51] Int. Cl.⁵ ............................................. G01C 15/02
[52] U.S. Cl. ........................................ 33/293; 33/299
[58] Field of Search .................. 33/293, 295, 299, 644

[56] References Cited

U.S. PATENT DOCUMENTS

| 3,188,739 | 6/1965 | Olsen et al. | 33/293 |
|---|---|---|---|
| 3,469,919 | 9/1969 | Zellner | 356/4 |
| 3,520,611 | 7/1970 | Picou | 356/72 |
| 3,541,572 | 11/1970 | Shults | 346/2 |
| 3,557,458 | 1/1971 | Shults | 33/69 |
| 4,084,327 | 4/1978 | Kool | 33/299 |
| 4,197,653 | 4/1980 | Laxo | 33/268 |
| 4,527,339 | 7/1985 | Brunson | 33/293 |
| 4,549,360 | 10/1985 | Allen | 33/293 |
| 4,593,474 | 6/1986 | Mayhew | 33/264 |
| 4,803,784 | 2/1989 | Miller | 33/293 |
| 4,926,563 | 5/1990 | Smith | 33/293 |
| 4,964,218 | 10/1990 | Morghen | 33/293 |

Primary Examiner—William A. Cuchlinski, Jr.
Assistant Examiner—Alvin Wirthlin
Attorney, Agent, or Firm—John L. Gray

[57] ABSTRACT

A line of sight target adaptor to be used with theodolite and photogrammetric optical targets involves a base portion in the shape of a segment of a sphere provided with a cylindrical portion upstanding from the side of the segment from the flat portion of the interior portion of the segment having a centrally disposed coaxial cylinder to receive a target positioned therein, the target being so dimensioned that it will be concentric with the center of a sphere based on the dimensions of the segment of the sphere constituting the base portion of the target adaptor.

4 Claims, 2 Drawing Sheets

LINE OF SIGHT TARGET ADAPTOR

BACKGROUND OF THE INVENTION

In the installation of large and sometimes complex tooling where great precision and dimensional control is required, it is customary practice to position such tooling using theodolite and photogrammetric optical targets to achieve dimensional control of engineering or component features. The procedure is also used for periodic inspection.

So-called cup mounts, sometimes referred to as candlesticks, are used to provide the control points from which orientation is derived or alignment checked. They also facilitate a line of sight that establishes a method of coordinating features located on the tooling fixture. Such cup mounts are monuments or permanent features in the baseline for construction or validation. The cup mounts are designed to accept standard optical spheres which in turn hold see-through targets. These optical spheres are really hollow spheres with opposite and equal segments removed so that the target may be inserted therein.

The current line of sight spherical mounts were designed originally to be used with alignment scopes and conventional type optical transits and levels. These instruments are single axis devices relying on the mount being in a parallel or 90° axis to the optical instrument. The introduction of electronic theodolites and photogrammetric measuring processes require target and instrument positions that necessitate a mutual viewing from various angles and attitudes by multiple instruments. In this regard, the conventional mount was severely limited because the outside diameter of the sphere limited the disk target from being viewed simultaneously by multiple instruments. This limitation of viewing angle presents a problem for processes and instrumentation requiring specific included or apex angles as related to electronic theodolite systems. The standard 2.250 inch diameter bore in the spherical mount that houses the disk-type target acts as an obstruction. This obstructed viewing is created when the disk target is inserted the required 0.750" necessary for the target center of the disk to become concentric with the spherical center of the mount. To facilitate setting this concentricity, a special gauge is used which must be set to the machined face of the current spherical-type mount. Special care must be taken when performing this operation.

SUMMARY OF INVENTION

Applicant's invention utilizes a segment of a sphere which has a portion upstanding therefrom and coaxial therewith adapted to receive the target. Such construction permits the target to be precisely located at a point that would be concentric with the center of a sphere located in the standard cup mount yet permits viewing in a vertical direction through an area of 270° and in a horizontal plane a viewing angle of 360° is possible. The line of sight target adapter is lighter, and easier to install, especially in confined areas or hard to access positions.

It is therefore an object of this invention to provide a line of sight target adapter which may be mounted in a standard cup mount.

It is a further object of this invention to provide such an adapter which may be viewed in a horizontal plane through a 360° circle and may be viewed in a vertical plane in an approximately 270° arc.

It is a still further object of this invention to provide such a line of sight target adapter which is light and easy to install, especially in inaccessible locations.

These, together with other objects and advantages of the invention will become more readily apparent to those skilled in the art when the following general statements and descriptions are read in the light of the appended drawings.

DETAILED DESCRIPTION OF THE INVENTION

Figure 1:
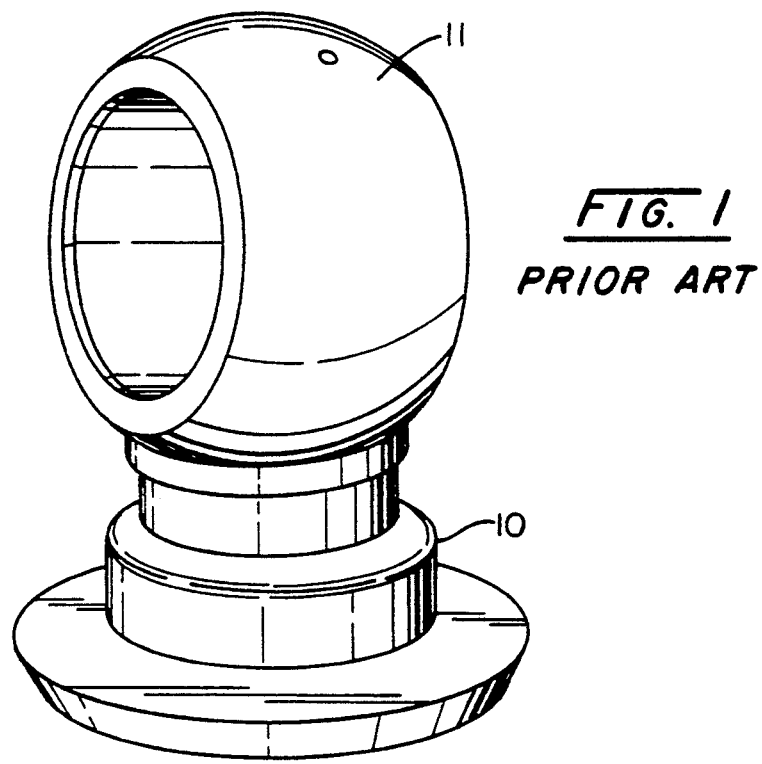
FIG. 1 shows the prior art spherical mount positioned in the standard optical cup mount.

Referring now to FIG. 1 which illustrates the prior art, the cup or candlestick mount 10 is shown holding the standard optical sphere 11 therein.

Figure 2:
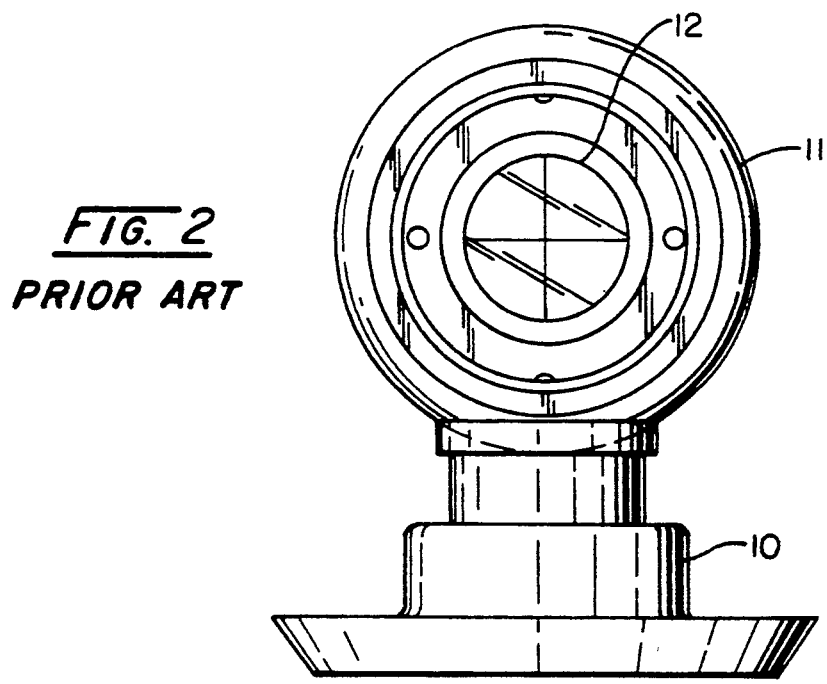
FIG. 2 shows such a prior art spherical mount with a prior art see-through target positioned in said spherical mount.

Referring now to FIG. 2, the disk target is positioned at the center of the sphere 11. It is spaced inwardly the required 0.750" and thus the sides of the spherical mount 11 that house the disk target 12 severely limit the viewing angle and prevent in many instances mutual viewing from various angles and attitudes by multiple instruments.

Figure 3:
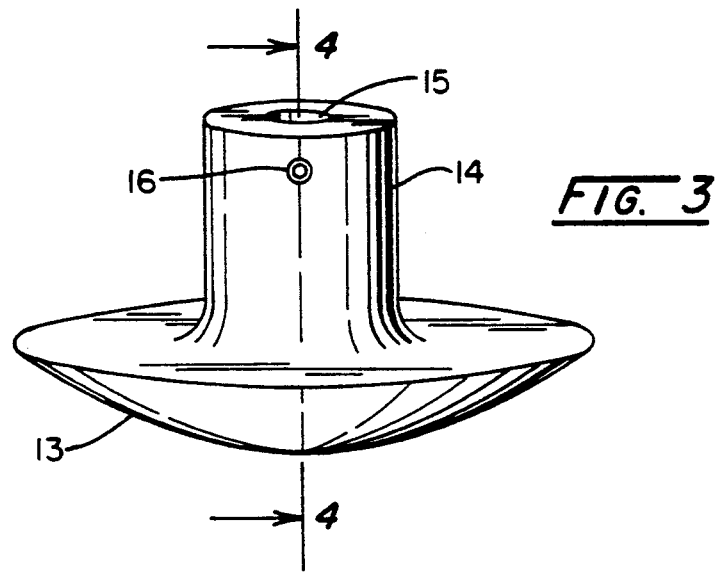
FIG. 3 is a perspective view of applicant's invention adapted to be placed in a standard cup-type mount.

Referring now to FIG. 3, applicant's invention is shown in perspective. It involves a base portion 13 from which a cylindrical portion 14 extends. The cylindrical portion 14 is provided with a centrally positioned coaxial hollow cylinder 15 adapted to receive the target. Positioned at right angles to the hollow cylinder 15 is a threaded aperture 16 which is adapted to receive a threaded member (not shown) to hold the target in place.

Figure 4:
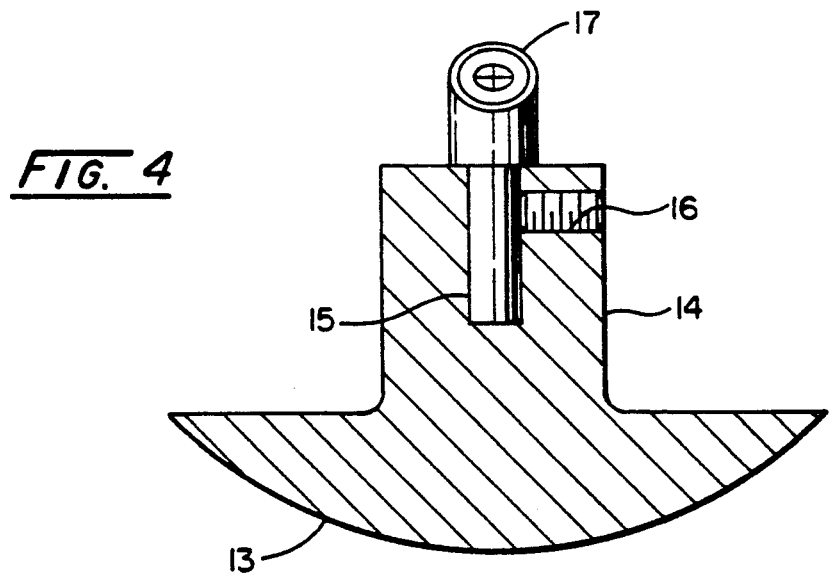
FIG. 4 is applicant's target adapter with the target positioned therein in section 4—4 of FIG. 3.

Referring now to FIG. 4, which is a cross-sectional view in section 4—4 of FIG. 3, the target 17 is shown with a portion of it positioned in the cylinder 16. The vertical dimension of the target 17 and the portion that fits in the cylinder 16 is chosen so that the target 17 will coincide with the center of a sphere based on the dimensions of the segment of the sphere 13 which is the base portion of the target 17.

Thus it will be seen that the target when placed in the target adaptor of the present invention may be viewed in a horizontal plane essentially through a 360° circle and may be viewed in a vertical plane in an approximately 270° arc.

While this invention has been described in its preferred embodiment, it is to be appreciated that variations therefrom may be made without departing from the true scope and spirit of the invention.

What is claimed is:

1. A line of sight target adapter comprising:
    a base portion in the shape of a segment of a sphere, including a spherical side,
    a cylindrical member upstanding from the side of said segment opposite to said spherical side and coaxial therewith, the upstanding end of said cylindrical member being flat and perpendicular to the axis of said cylindrical member, said upstanding end of said cylindrical member being provided with a hollow cylinder centrally positioned in said upstanding end of said cylindrical member and coaxial therewith and adapted to receive a target provided with a flat portion therein, said flat portion of said target being adapted to abut against the flat upstanding end of said cylindrical member.

2. The line of sight target adapter of claim 1 wherein means is provided to secure said target in said hollow cylinder during any position of said base portion.

3. The line of sight target adapter of claim 2 wherein said means which is provided to hold said cylindrical target in said hollow cylinder during any position includes a threaded aperture through said cylindrical member and at right angles to said hollow cylinder.

4. The target adapter of claim 3 wherein the height of said cylindrical member is chosen and the length of the target is chosen so that when said target is positioned in said cylindrical member the center of the target will be concentric with the center of a sphere based on the radius of the segment of a sphere constituting said base portion.

* * * * *